G. P. SINGER AND R. J. HICKMAN.
MACHINE FOR INSERTING PINS INTO HOLLOW ARTICLES.
APPLICATION FILED OCT. 6, 1919.
1,386,372.
Patented Aug. 2, 1921.
2 SHEETS—SHEET 1.
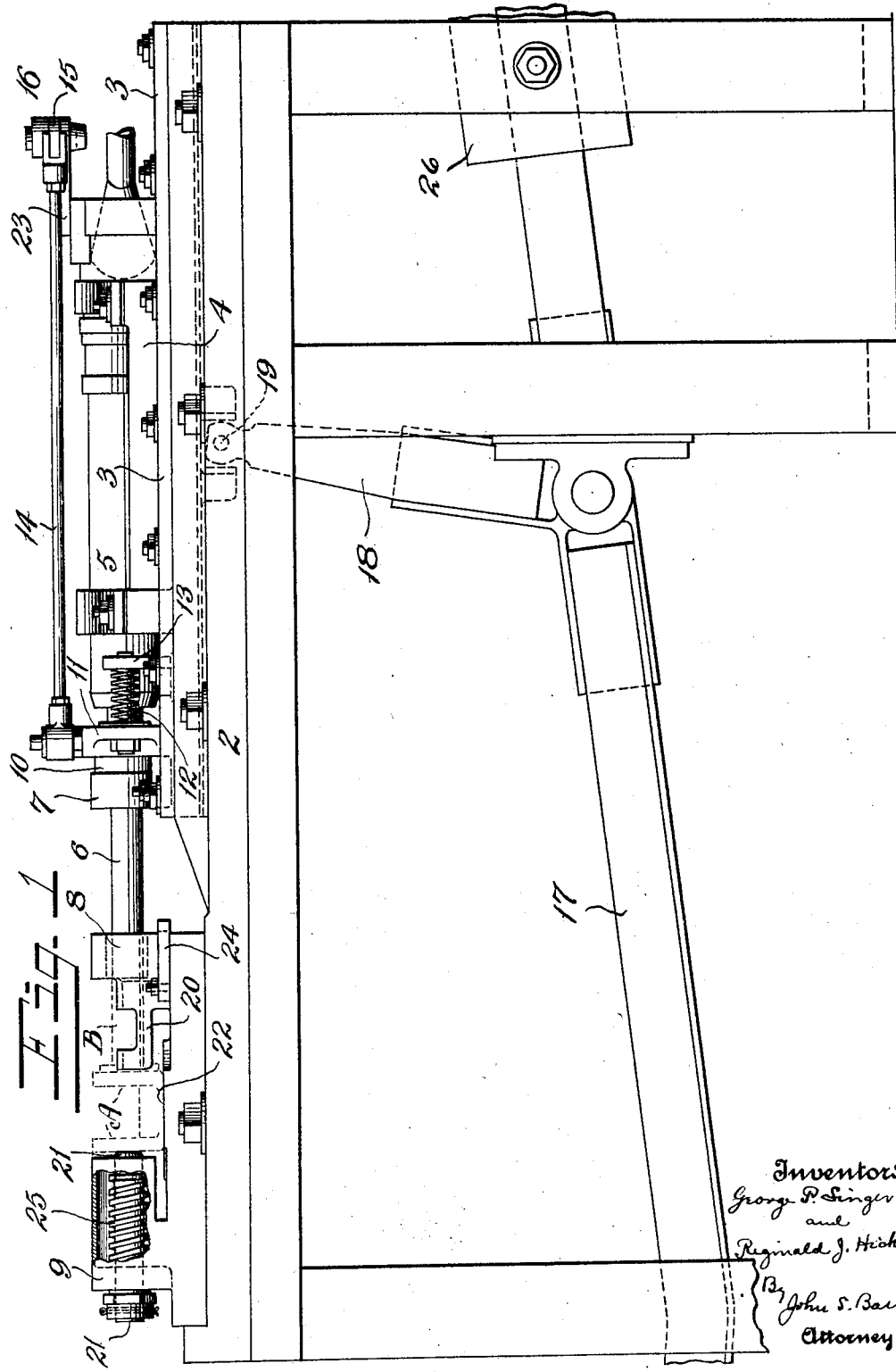

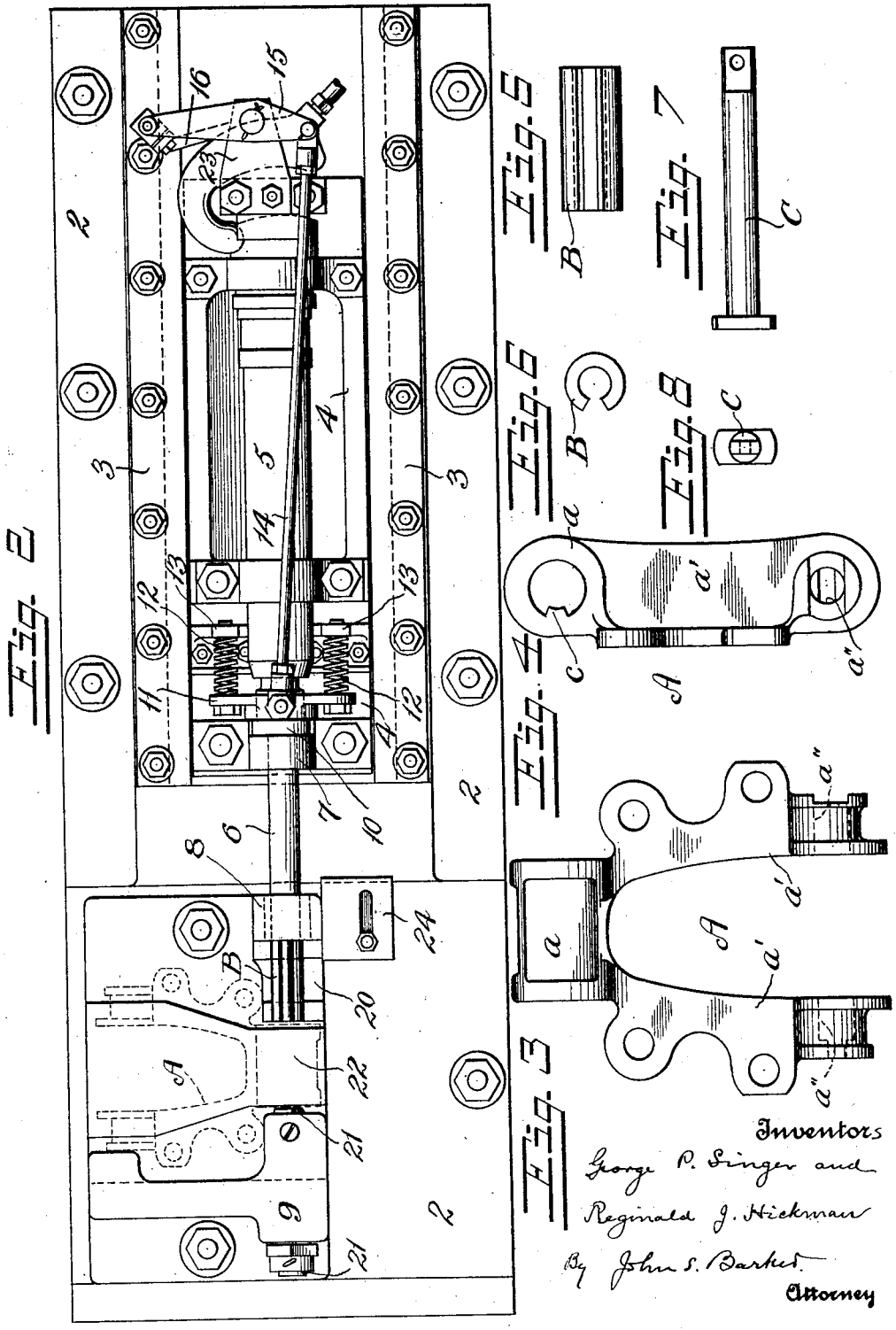

UNITED STATES PATENT OFFICE.

GEORGE P. SINGER AND REGINALD J. HICKMAN, OF MILWAUKEE, WISCONSIN, ASSIGNORS TO CHAIN BELT COMPANY, OF MILWAUKEE, WISCONSIN, A CORPORATION OF WISCONSIN.

MACHINE FOR INSERTING PINS INTO HOLLOW ARTICLES.

1,386,372.  Specification of Letters Patent.  Patented Aug. 2, 1921.

Application filed October 6, 1919. Serial No. 328,713.

*To all whom it may concern:*

Be it known that we, GEORGE P. SINGER and REGINALD J. HICKMAN, the former a citizen of the United States and the latter a subject of the King of Great Britain, residing at Milwaukee, in the county of Milwaukee and State of Wisconsin, have invented certain new and useful Improvements in Machines for Inserting Pins into Hollow Articles, of which the following is a specification.

Our invention relates to mechanism for inserting pins, either solid or hollow, into hollow articles, and has been especially devised for inserting hard steel bushings into the hollow end bars of cast malleable iron chain links intended to be used for power transmission and conveying purposes, and for inserting the connecting pins employed to unite such links to form chains. It has been found that these bushings and connecting pins, which fit the parts into which they are inserted closely, can be successfully forced into place only by means of driving blows such as would be given by a hammer and the hand of a workman, for if attempt be made to force one of them into place by a single steady drive or push it is liable to become more or less canted or out of line.

The invention has therefore for its object to produce an improved machine that can be successfully and rapidly used for accomplishing the work referred to.

In the accompanying drawings Figure 1 is a side view of a machine made according to our invention and devised for driving into place the bushings that are to be seated in the end bars of links and the pins employed in coupling together the bushed links to form a chain.

Fig. 2 is a top plan view of the machine shown in Fig. 1.

Fig. 3 is a plan and Fig. 4 a side view of a link such as the machine shown in Figs. 1 and 2 is adapted to operate upon.

Fig. 5 is an elevation, and Fig. 6 an end view of a bushing that is to be applied to the chain shown in Figs. 3 and 4, and Fig. 7 is an elevation of the coupling pin employed to unite the links, and Fig. 8 an end view.

The link A illustrated in Figs. 3 and 4, which is of well known type, is usually formed of malleable cast iron, and comprises a hollow end piece or bar $a$, and side bars $a'$, in the ends of which are formed openings $a''$. A bushing B, Figs. 5 and 6, of steel is fitted tightly into the hollow end bar $a$, the bushing being usually split and its edges separated to form a slot in which lies a lug or lugs, $c$, on the interior of the hollow cross bar $a$. A steel connecting pin C, Figs. 7 and 8, passes through the openings $a''$ in the side bars $a'$ and the bushed cross bar of the link to be united thereto, which lies between the ends of the side bars so the opening through the bushing is in line with the openings $a''$, and thus unites the links to form a chain. These parts are of well known construction and are referred to merely that the use of the machine to be described may be the better understood.

This machine comprises a bed piece 2 provided near one end with a seat 22 for one of the links A. The bed piece is provided at its other end with guides 3—3 that are parallel with the axis of the opening through the hollow end bar of a link occupying the seat 22, and between which sets a carriage 4 supporting a pneumatic hammer. As this latter may be of any usual or preferred construction it need not be illustrated or described beyond stating that it comprises the usual cylindrical casing 5 in which is located the motor mechanism, a hammer tool 6, projecting beyond the end of the casing and movable relative thereto and the usual mechanism including the trigger 16 by which the flow of the motor fluid that operates the hammer is controlled. This tool 6 is inserted in, and supported by, the pneumatic hammer casing at its inner end, and reciprocates in a bearing or guide 8, rising from the bed piece 2 immediately adjacent to a rest or holder 20 for the pin to be driven. The hammer tool 6 is of suitable shape to drive the particular article upon which it is to be used, that for driving hollow pieces or bushings being somewhat different in shape from that employed to drive connecting or other solid pins; but these modifications of the shape of the tool to suit the particular use to which it may be put are not part of our invention, but rather belong to the field of the skilled mechanic or tool maker.

The hammer tool is provided with an intermediate collar 10 adapted normally to abut against a safety stop 7 carried by the carriage 4 as represented in the drawings, the hammer being, by such engagement, arrested in its inward movement—that is its movement toward the chain link seat 22. A yoke 11 straddles the hammer tool and bears against the outer face of the collar 10 against which it is held by springs 12 lying between the yoke and stationary abutments or bearings 13, rising from the carriage 4. A link 14 connects the yoke 11 with a lever 15, pivotally supported in a bracket 23 rising from the carriage near the outer or air supply end of the pneumatic hammer. The lever 15 is connected with or bears against the air controlling trigger 16 of the pneumatic hammer; and the relationship of the parts 14, 15 and 16 is such that the control valve is closed and the motor fluid cut off from the hammer whenever the yoke 11 and the collar 10 of the hammer tool are arrested by the safety stop 7. If however, the carriage 4 be moved inwardly relative to the hammer tool, thereby separating the collar 10 from the safety stop, and putting the springs 12 under tension, the air control mechanism is operated, through the link 14, the lever 15, and the hammer trigger 16, and the hammer is thereupon set into operation.

17 indicates an operating lever, preferably a foot lever, provided with an arm 18 having connection 19 with the carriage 4, and adapted when its free end is depressed to force the carriage inwardly or toward a link occupying the seat 22. The lever is provided with an extension carrying a weight 26, adapted to rock the lever, when free from the foot of the operator, and to move the carriage 4 outward, to the position represented in Figs. 1 and 2.

An anvil 9 rises from the bed piece 2 in line with the hammer tool 6 and on the opposite side of the link seat 22 from the pin rest 20. A centering pin 21 is slidably supported in the anvil. A spring 25 acts upon the pin 21 and causes its inner end to project beyond the face of the anvil next the link seat. 24 designates an adjustable stop supported by the bed piece and arranged to arrest the carriage and cause the driving operation to be stopped when the bushing or pin being operated upon has been driven to the desired extent.

The operation of the machine is as follows:

A link, A, into which a bushing B is to be driven, is properly placed in the seat 22 with its hollow end, a, between the anvil 9 and the rest 20. Upon this rest is placed the bushing to be driven. The centering pin, 21, is caused by the spring 25 to enter somewhat into the hollow end bar of the link and thus operates to position the latter. The operator now places his foot upon the lever 17 depressing it and forcing the carriage inwardly. This carries the end of the hammer tool 6 against the bushing and forces the latter against the end of the hollow cross bar of the link into which it is to be driven. The parts are thus accurately and quickly placed for having the bushing driven, but until now the hammer has not operated, since all the parts supported by the carriage have moved together and the collar 10 of the hammer tool has remained in engagement with the stop 7 against which it has been held by the springs 12. But when the end of the bushing comes into engagement with the end bar of the link further inward movement of the hammer tool will be arrested. If now the operator further depress the lever 17, as he will do, the carriage is still further moved inwardly, without, however, the hammer tool being correspondingly moved, so that the hammer tool 6, the yoke 11, the rod or link 14, and that end of the lever 15 to which the link is attached remain stationary, while the fulcrum bracket 23 of the lever, which is secured to the carriage 4, is moved, causing the lever 15 to turn upon its fulcrum and, by reason of its engagement or connection with the trigger 16, depress the air control valve spindle (not shown in the drawing), thereby admitting the motor fluid to the hammer, which immediately begins its driving operation. The hammer tool is held by the springs 12, firmly against the bushing, and the operator by maintaining pressure upon the lever 17 gradually moves the carriage inwardly in advance of the hammer, thus maintaining open the air control mechanism. When the carriage has been moved inwardly to the desired extent for the particular work to be performed, it comes into engagement with the adjustable stop 24 by which it is arrested. The hammer continues to be operated, however, until pressure is relieved from the foot lever 17, whereupon the carriage is moved outwardly by the action of the weight 26, removing pressure from the end of the hammer tool and permitting the springs 12 to force the yoke 11 out and the collar 10 of the hammer tool toward the safety stop 7 until they are arrested thereby, which moves, through the rod 14 and lever 15, to relieve the air control trigger from pressure and permit the valve of the hammer to cut off the motor fluid, whereupon the hammer ceases to operate. When this occurs the bushing will have been properly seated, and the operator, still withholding pressure from the foot lever 17, allows the weight 26 to return the moving parts of the machine to their normal positions indicated in Figs. 1 and 2. As the bushing is driven into place it gradually forces the centering pin 24 before it.

While the machine that we have devised and described is intended to drive the bushings and coupling pins of chain links, as has been described, it will be understood that the invention in its useful applications is not to be limited to the particular use described, as it could be as well adapted for seating bushings in other articles as in chain links, and also for performing analogous operations and we therefore wish it to be understood that our invention is applicable to a wide variety of uses.

While we have represented the motor that operates the tool 6 to drive the bushing or pin, as being a pneumatic hammer, we wish it to be understood that this particular form of motor is chosen as being typical, although well adapted for use in the machine herein illustrated; and our invention is not to be limited in its useful applications to being used with a motor of this particular kind, as any other that will operate the tool 6 and perform the driving and other operations of the machine herein described may be used in lieu of a pneumatic hammer.

We claim:

1. In a machine for driving pins into hollow articles, the combination of a seat for the article, an anvil against which it bears, a centering pin carried by the anvil arranged to enter the hollow member of the article, a rest for supporting the pin in position to be driven and a hammer for driving the pin from its rest into the said hollow article.

2. In a machine such as described in claim 1 means for yieldingly supporting the centering pin whereby it is gradually forced out of the hollow article as the pin is driven therein.

3. In a machine for driving pins into hollow articles, the combination of a hammer including a casing inclosing the motor mechanism, a hammer tool movable relative to the casing and mechanism for controlling the motor fluid that operates the hammer, a carriage in which the hammer is supported, means for moving forward the carriage to bring the hammer tool against the work and for continuing the movement of the carriage after the tool has been arrested in its advance by coming into engagement with the work, and connections between the hammer tool and the control mechanism of the hammer arranged to operate the latter to start the hammer whenever the casing of the hammer is moved forward relative to the hammer tool.

4. In a machine for driving pins into hollow articles, the combination of a hammer including a casing inclosing the motor mechanism, a hammer tool movable relative to the casing and mechanism for controlling the motor fluid that operates the hammer, a carriage in which the hammer is supported, means for holding with yielding force the hammer tool in a normal forward position relative to the casing of the hammer, means for moving forward the carriage to bring the hammer tool against the work and for continuing the forward movement of the carriage after the tool has been arrested in its advance by coming into engagement with the work whereby the means that hold the hammer tool in normal position are put under additional tension and connections between the hammer tool and the control mechanism of the hammer for operating the latter to admit motor fluid to the hammer whenever there is a forward movement of the casing relative to the hammer tool.

5. In a machine for driving pins into hollow articles, the combination of a hammer including a hammer tool and mechanism for controlling the motor fluid that operates the hammer, a carriage carrying a safety stop relative to which the hammer tool reciprocates and also carrying the mechanism that controls the motor fluid, manually controlled means for moving the carriage forward toward the work to bring the hammer tool against the latter and for continuing the movement of the carriage after the tool has been arrested by coming into engagement with the work whereby it is caused to move relative to the safety stop carried by the carriage, and connections between the hammer tool and the control mechanism for the motor fluid arranged to operate the latter to admit the motor fluid to the hammer whenever the safety stop is moved outward relative to the hammer tool.

6. In a machine for driving pins into the hollow members of chain links the combination of a seat for the chain link, a rest for supporting a pin in position to be driven, a carriage movable toward and from the link seat and pin rest, a pneumatic hammer supported in the said carriage including a casing that incloses the motor mechanism, a hammer tool movable relative to the casing, and mechanism for controlling the motor fluid that operates the hammer, a bearing adjacent to the pin rest in which the hammer tool is supported and reciprocates, manually controlled means for moving the carriage forward to bring the hammer against the pin when upon the rest and for continuing the movement of the carriage after the tool has been stopped in its advance by coming into engagement with the pin and connections between the hammer tool and the air control mechanism arranged to open the latter to admit motor fluid to the hammer whenever the carriage is moved forward relative to the hammer tool.

7. In a machine for driving pins into the hollow members of chain links, a seat for the chain link, a carriage movable toward and from the said seat, a pneumatic hammer supported in the carriage—including a casing, a hammer tool movable relative to the casing, the hammer tool being provided with a collar, and mechanism for controlling the motor fluid that operates the hammer—a safety stop carried by the carriage, relative to which the hammer tool reciprocates, springs acting on the hammer tool for forcing it in a forward direction with the collar thereof in engagement with the safety stop carried by the carriage, connections between the hammer tool and the control mechanism for the motor fluid that operates the hammer, arranged to operate the control mechanism and admit motor fluid to the hammer whenever the casing of the pneumatic hammer is moved inwardly relative to the hammer tool, and means for advancing the carriage toward a link resting in the seat therefor.

GEORGE P. SINGER.
REGINALD J. HICKMAN.